United States Patent
Mitchell et al.

(10) Patent No.: US 11,607,694 B2
(45) Date of Patent: Mar. 21, 2023

(54) SYSTEM AND METHOD FOR CONDITIONING AND PACKAGING FRESHLY CHOPPED BIOMASS FEEDSTOCKS FOR LONG TERM STORAGE

(71) Applicants: Lucas C. Mitchell, Raleigh, NC (US); Hannah E. Monroe, Raleigh, NC (US); Carrie E. Sanford, Charlotte, NC (US)

(72) Inventors: Lucas C. Mitchell, Raleigh, NC (US); Hannah E. Monroe, Raleigh, NC (US); Carrie E. Sanford, Charlotte, NC (US)

(*) Notice: Subject to any disclaimer, the term of this patent is extended or adjusted under 35 U.S.C. 154(b) by 213 days.

(21) Appl. No.: 16/921,200

(22) Filed: Jul. 6, 2020

(65) Prior Publication Data
US 2021/0001348 A1 Jan. 7, 2021

Related U.S. Application Data

(60) Provisional application No. 62/870,194, filed on Jul. 3, 2019.

(51) Int. Cl.
| | | |
|---|---|---|
| *A01F 15/00* | (2006.01) |
| *B02C 18/22* | (2006.01) |
| *B30B 9/30* | (2006.01) |
| *B65B 1/28* | (2006.01) |
| *B65B 63/02* | (2006.01) |
| *B65B 27/12* | (2006.01) |

(52) U.S. Cl.
CPC .......... *B02C 18/2291* (2013.01); *A01F 15/00* (2013.01); *B30B 9/3075* (2013.01); *B30B 9/3078* (2013.01); *B65B 1/28* (2013.01); *B65B 63/02* (2013.01); *B65B 27/125* (2013.01)

(58) Field of Classification Search
CPC .. A01F 15/00; B30B 9/00; B30B 9/30; B30B 9/3075; B30B 9/3078; B65B 63/02; B65B 27/00; B65B 27/12; B65B 27/125
See application file for complete search history.

(56) References Cited

U.S. PATENT DOCUMENTS 4,953,344 A * 9/1990 Wallace ................. B65B 63/02
100/295
2015/0272009 A1* 10/2015 Adams ................. B65B 63/028
100/17

* cited by examiner

*Primary Examiner* — Chelsea E Stinson
(74) *Attorney, Agent, or Firm* — Coats & Bennett, PLLC (57) ABSTRACT

The method or process described is directed at conditioning and packaging freshly chopped biomass such that it can be stored for a long period of time without spoilage and such that the packaged chopped biomass is easily transportable and its composition and other properties remain stable.

13 Claims, 10 Drawing Sheets

SYSTEM AND METHOD FOR CONDITIONING AND PACKAGING FRESHLY CHOPPED BIOMASS FEEDSTOCKS FOR LONG TERM STORAGE

The system and method described herein was conceived, designed and developed by three students as a part of a senior design project in the Department of Biological and Agricultural Engineering at North Carolina State University in Raleigh, N.C. These three inventors are: Lucas C. Mitchell, Hannah E. Monroe, and Carrie E. Sanford.

FIELD OF THE INVENTION

The present invention relates to a system and process for conditioning and packaging freshly chopped biomass feedstocks.

BACKGROUND OF THE INVENTION

Underway across the United States and throughout the world is a movement away from fossil fuels to renewable sources. It is widely recognized that there is a growing need for sustainable energy in order to reduce reliance on fossil fuels. Biomass feedstocks, such as sorghum, *miscanthus* and switchgrass, are possible options. After all, biomass feedstocks are renewable, produce less hazardous waste, and can be grown in many geographical areas of the world including marginal lands. Besides being a source for clean and renewable energy, biomass feedstock is used widely as animal feed.

Common biomass feedstocks in the United States (e.g. hay) are typically harvested by method of mowing and baling. A mowing and baling system in hay production has multiple advantages including independent operation efficiency and in some baling systems minimal necessary storage infrastructure. Common drawbacks to the mowing-baling approach includes a multi-pass harvesting system and minimal effectiveness when processing fresh material with relatively high moisture content. Complicating the mowing-baling method is that certain unit operations require multiple days to complete from the start of mowing to completion of baling. Furthermore, the necessity of several rain free days can prove problematic.

In recent years, farmers have turned to harvesting forage crops by a forage harvester. Forage chopping has numerous advantages, including being a single pass operation whereby the material is also sized. Sizing the material through chopping and shredding increases the feedstock's surface area and in some cases adds versatility to the crop's potential end uses.

There are, however, some inherent disadvantages and challenges with chopped biomass harvesting, mainly relating to packaging and storage. Storage in silos, bunkers, and other structures requires significant labor, infrastructure and cost. Perhaps the most important concern and challenges lie in employing a system and process that is capable of conditioning the chopped biomass and packaging it such that it can be stored long term without spoilage and can be easily handled and transported.

Therefore, there is a need for a system and method for conditioning and packaging freshly chopped biomass feedstock that can be stored long term without substantial risk of spoilage and which can easily be transported.

SUMMARY OF THE INVENTION

The method or process described below is directed at conditioning and packaging freshly chopped biomass such that it can be stored for a long time period without spoilage and such that the packaged, chopped biomass is easily transportable and its composition and other properties remain stable.

The present invention also includes an apparatus for conditioning and facilitating the packaging of the freshly chopped biomass. In one embodiment, the apparatus includes a horizontal baler having a compression chamber and a plunger. Freshly chopped biomass is fed into the compression chamber, after which the plunger engages the chopped biomass and compresses it into a bale that is ultimately packaged for long term storage.

In one embodiment, the compression chamber of the baler is elongated and includes a plurality of removable end plates or bulkheads. The removable end plates or bulkheads enable the baler to form compressed partial bales and to integrate the partial bales into a single bale that is packaged.

In one embodiment of the apparatus, the compression chamber includes one or more slotted or perforated sections configured to expel air and/or liquid from the chopped biomass in the course of compressing the chopped biomass.

Another feature of the apparatus found in one embodiment is that the apparatus is configured to facilitate the packaging of the chopped biomass after compression. This feature entails an end section that projects from a remote end of the compression chamber and which is particularly designed to receive a pliable bag that extends over a portion of the end section such that after the upstream compression process, a finished bale is pushed through the extension into the bag 24 which thereafter is removed from the baler and the opening securely closed.

The apparatus and method of the present invention in one embodiment entails packaging a compressed bale of freshly chopped biomass in a bag or container configured to maintain anaerobic conditions in the container or bag during long term storage.

Other objects and advantages of the present invention will become apparent and obvious from a study of the following description and the accompanying drawings which are merely illustrative of such invention.

DESCRIPTION OF EXEMPLARY EMBODIMENTS

The present invention pertains to a system and process for conditioning and packaging chopped biomass feedstocks. There are many different types of biomass feedstocks, such as sorghum, *miscanthus*, and switchgrass. The system and process described herein is designed to condition and package various types of chopped biomass feedstocks.

The system and process aims at conditioning and packaging chopped biomass feedstocks such that the chopped biomass can be stored for long term with minimal spoilage. As used herein, the term "long term" means six months or more. Preferably, the process aims to condition and package chopped biomass such that it can be stored for one year or more without spoilage.

More particularly, conditioning entails densifying the chopped biomass to a relatively high bulk density level. Ideally, chopped biomass should be densified to at least 15 lb/ft$^3$. During the densification process, air and liquid are expelled from the chopped biomass. During the course of densifying the chopped biomass, the chopped biomass is formed into bales. Packaging entails placing the densified chopped biomass bales in bags or containers and closing the bags or containers such that the densified biomass therein is maintained under anaerobic conditions.

Figure 1:
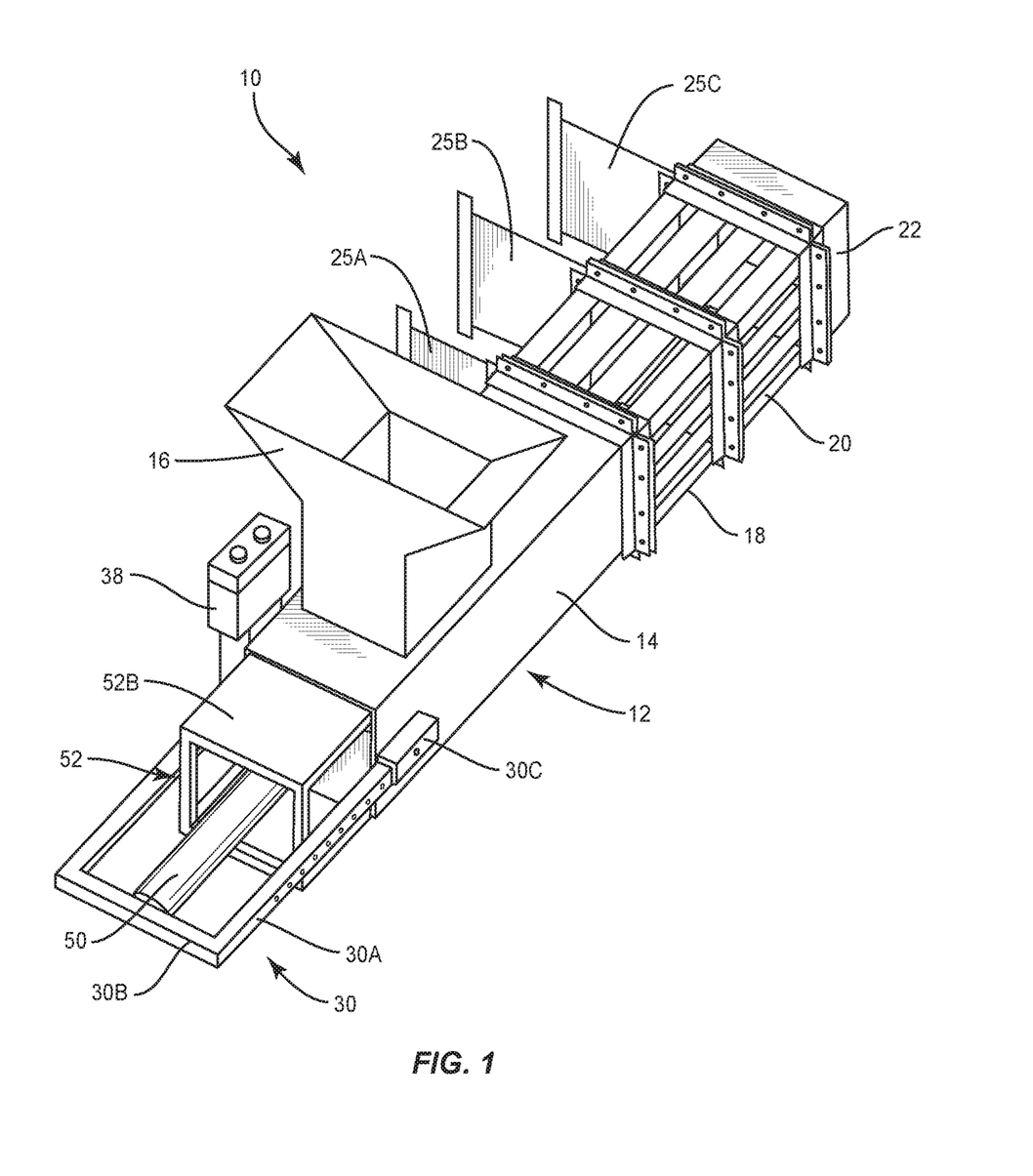
FIG. 1 is a perspective view of an apparatus according to the present invention which functions to condition and package freshly chopped biomass.

Now turning to the drawings, particularly FIG. 1, there is shown therein an apparatus for conditioning and packaging chopped biomass feedstocks. The apparatus is generally referred to by the numeral 10. As seen in the drawings, apparatus 10 is in the form of a horizontal baler used to compress, densify and facilitate the packaging of the chopped biomass. Apparatus 10 includes an elongated compression chamber indicated generally by the numeral 12.

Chopped biomass is fed into the compression chamber 12 and subjected to a densification process. Viewing the compression chamber 12 in more detail, it includes an initial section 14 that actually receives freshly chopped biomass. Extending upwardly from the initial section 14 is an inlet or hopper 16. Inlet or hopper 16 includes an open top and is open to the underlying initial section 14 of the compression chamber. Freshly chopped biomass is fed into the hopper 16 and passes through the hopper and enters the initial section 14. In one embodiment, the initial section 14 includes four sides that enclose this portion of the compression chamber 12.

Downstream from the initial section 14, the compression chamber 12 includes one or more additional sections. In the particular embodiment illustrated in the drawings, the compression chamber 12 includes first and second sections 18 and 20. First section 18 is secured adjacent the downstream end of the initial section 14. During the process, chopped biomass, after some degree of compression, passes from the initial section 14 into the first section 18. Second section 20 is secured by bolts or other suitable means to the downstream end of the first section 18. As seen in the drawings, first and second sections 18 and 20 include slotted or perforated sides. As the chopped biomass is compressed while passing through the slotted or perforated first and second sections 20, air and liquid are expelled from the chopped biomass. This is particularly beneficial from the standpoint of conditioning and packaging chopped biomass that can be stored for a long term without spoilage. Excess air and/or moisture in the densified chopped biomass may have the tendency to cause the chopped biomass to spoil. Besides expelling air and liquid from the biomass, the slotted or perforated sides of sections 18 and 20 enable an operator to visually inspect the movement of the densified chopped biomass through the apparatus. It is understood and appreciated that the particular configuration of the compression chamber 12 and the sections 14, 18 and 20 can vary. The design shown in the drawings is exemplary.

Secured to the remote end of apparatus 10 is an end section 22. End section 22 forms a channel through which the baled chopped biomass passes during discharge. As discussed later, end section 22 is configured to cooperate with a container, such as a pliable bag 24, during the packaging of the baled chopped biomass. That is, the open end of a bag can be slipped over the exterior sides of the end section 22 and this permits the baled chopped biomass to be directly discharged into the bag 24.

Compression chamber 12 also includes a series of removable end plates or bulkheads 25A, 25B, and 25C. See FIG. 1. The number of end plates or bulkheads and their locations can vary. In the example shown in the drawings, there are provided three end plates or bulkheads 25A, 25B, and 25C. These end plates or bulkheads are slideably mounted for transverse movement between an inserted position and a position outside of the compression chamber 12. That is, each end plate can assume a position inside the compression chamber 12 where it acts as a backstop against which the chopped biomass is compressed. As shown in FIG. 1, the end plates or bulkheads 25A, 25B, and 25C can be moved transversely from the compression chamber 12 to an outside position. There are various ways to support the end plates or bulkheads 25A, 25B, and 25C for transverse movement. In the exemplary design shown in the drawings, each of the end plates or bulkheads are slideably mounted to the compression chamber 12 and when disposed inside the compression chamber, the end plates or bulkheads are securely held to withstand the longitudinal forces incurred during the densification of the chopped biomass.

Apparatus 10 includes a hydraulically powered plunger that is employed to compress chopped biomass in the compression chamber 12. An adjustable and moveable superstructure, indicated generally by the numeral 30, is detachably secured to an upstream end portion of the apparatus. See FIG. 1. Superstructure 30 is in the form of a U-shaped yoke and includes a pair of legs 30A and a transverse member 30B. There is also provided a pair of sleeves 30C secured to opposed sides of the initial section 14 for receiving the legs 30A. Note that each leg 30A includes a series of spaced-apart pin openings formed therein. There is also a least one pin opening in each of the sleeves 30C. Thus, it is appreciated that the superstructure 30 can move fore and aft with respect to the compression chamber 12. In FIG. 1, the superstructure 30 is shown in the extreme upstream position. It is this position where the superstructure 30 normally resides when the chopped biomass is being compressed in the compression chamber 12. However, as described subsequently herein, it is advantageous to move the superstructure 30 towards the discharge end of the apparatus 10 during a mode of operation when finished bales of chopped biomass are being discharged from the apparatus. See FIGS. 2C, 3D and 3K. This is achieved by simply removing the locking pins engaged with the legs 30A and pushing the legs 30A through the sleeves 30C toward the discharge end of the apparatus after which the locking pins are re-inserted through the sleeves and into a selected pin opening in the legs.

Secured to the superstructure 30 is a double-acting hydraulic cylinder 50. FIG. 1. Note that the hydraulic cylinder 50 is anchored to the transverse member 30B of the superstructure 30. From the anchor point, the hydraulic cylinder projects forwardly toward the discharge end of the apparatus 10. Hydraulic cylinder 50 includes a rod 50A. See FIGS. 2A and 2B. Rod 50A is connected to a plunger indicated generally by the numeral 52. Plunger 52 includes a frame structure that is configured to slide back and forth through the compression chamber 12 in the course of compressing chopped biomass. As seen in FIGS. 1 and 2, the plunger 52 includes a closed face 52A that engages the chopped biomass during compression. Further, plunger 52 includes a closed top 52B. Except for the closed face 52A and closed top 52B, the frame structure of the plunger 52 is open.

Rod 50A of hydraulic cylinder 50 is connected to the face 52A of the plunger. Hence, the actuation of the hydraulic cylinder 50 results in the plunger 52 moving back and forth which in this case is back and forth within the initial section 14 of the compression chamber 22. The cross-sectional area of the plunger 52 is slightly less than the cross-sectional area of the initial section 14.

Figure 2A:
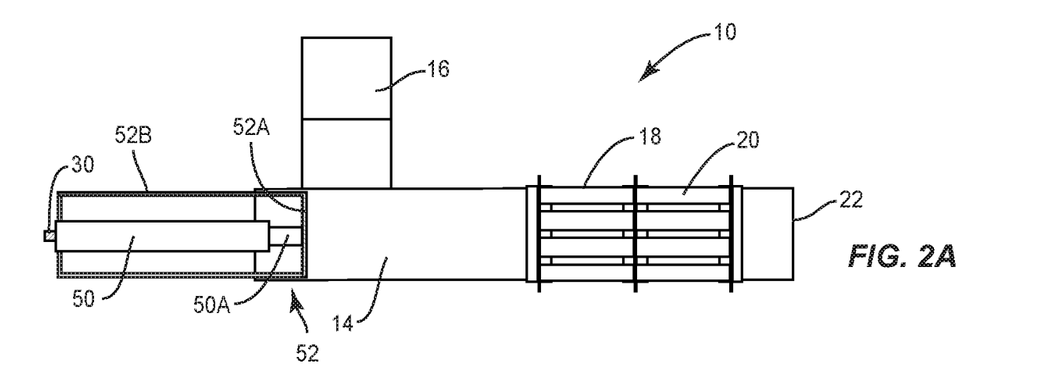
FIG. 2A is a schematic sectional view showing the apparatus of FIG. 1 wherein a plunger employed to compress the chopped biomass is shown in the retracted position.
Figure 2B:
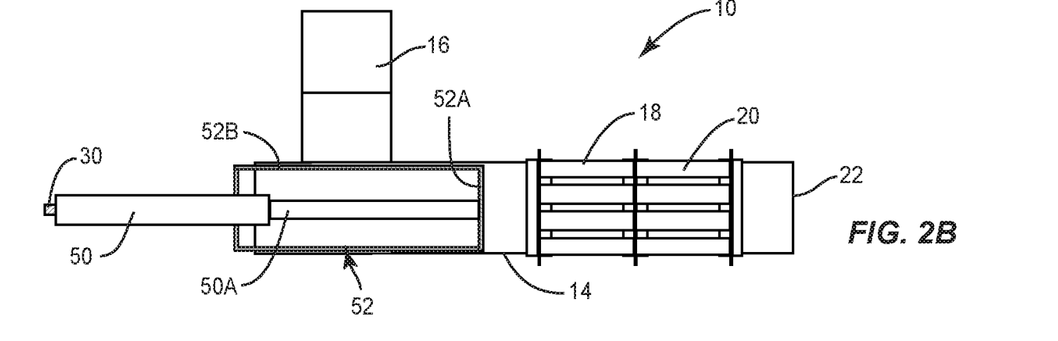
FIG. 2B is a schematic cross-sectional view similar to FIG. 2A but showing the plunger in a fully extended position.
Figure 2C:
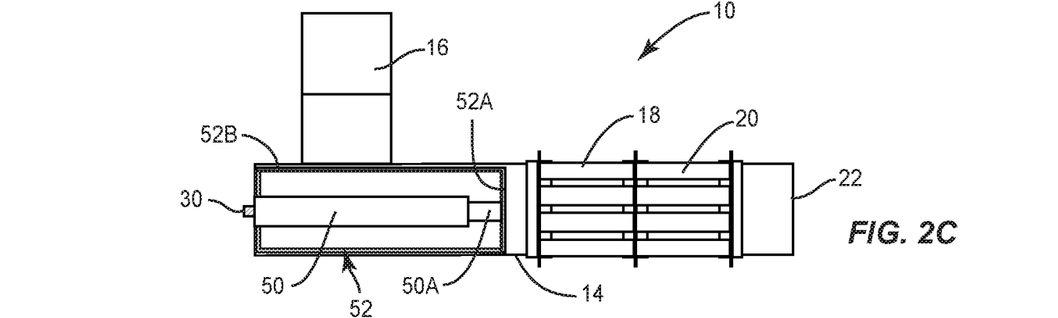
FIG. 2C is a schematic sectional view similar to FIGS. 2A and 2B but wherein a superstructure that supports the plunger is moved and stationed towards the discharge end of the apparatus.
Figure 2D:
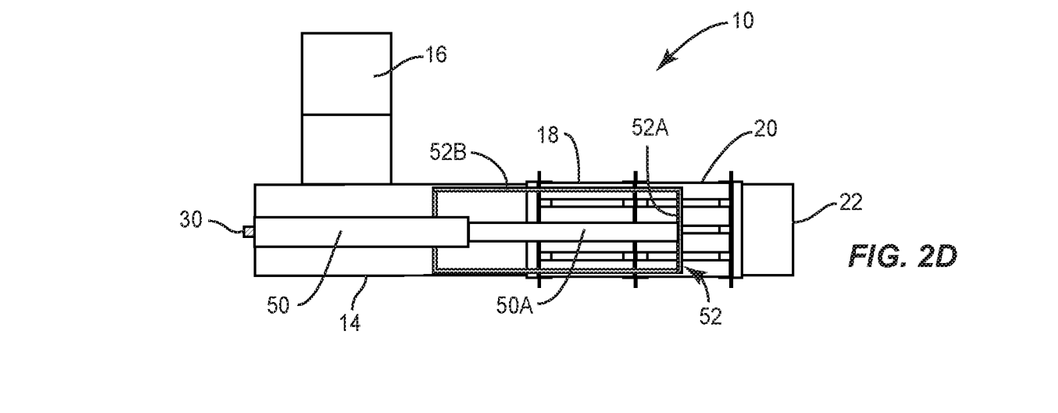
FIG. 2D is a schematic sectional view similar to FIG. 2C except that the plunger is shown in the extended position.

FIG. 1 depicts the superstructure 30, as well as the cylinder 50 in the position that they normally occupy during the compression mode of operation. As shown in FIG. 2A, the rod 50A of the cylinder 50 is in the retracted position. When in the retracted position, the face 52A of the plunger is disposed on the upstream side of the opening in the hopper 16. This helps assure that during the feeding process, the chopped biomass is directed downwardly into the initial section 14 such that the chopped biomass is disposed on the downstream side of the face 52A. When the plunger 52 is fully extended, the face 52A will be disposed a selected distance (for example, in one embodiment approximately 1') upstream from the first end plate 25A.

Figure 4:
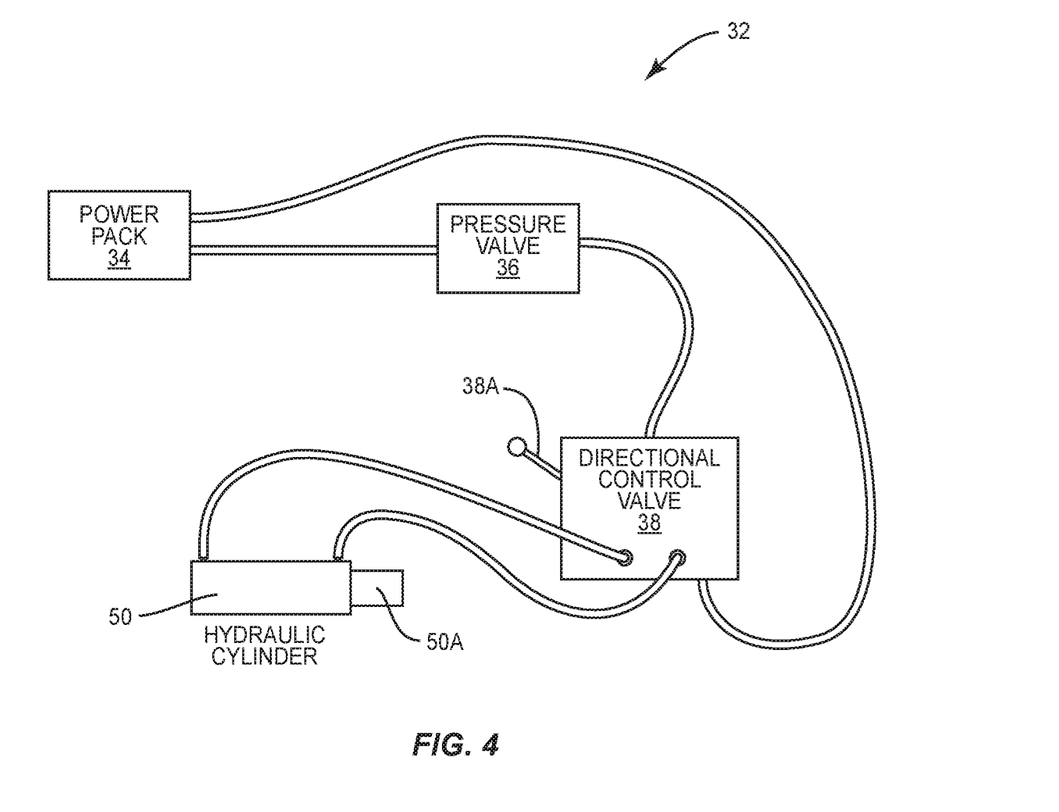
FIG. 4 is a schematic illustration of a hydraulic system employed in the apparatus of the present invention.

A hydraulic system is used to drive and control the plunger 52. A schematic diagram of the hydraulic system 32 is shown in FIG. 4. A hydraulic power pack 34 is used to power cylinder 50. As people of ordinary skill in the art appreciate, a hydraulic power pack typically includes a motor, pump and a hydraulic fluid reservoir. A manually operated directional control valve 38 is operatively connected between the power pack 34 and the hydraulic cylinder 50. Directional control valve 38 in this example is a three position valve which includes a neutral position, a position that extends the rod 50A of the cylinder 50 and a position that retracts the rod. Note that the directional control valve 38 includes a handle 38A that is used to actuate the directional control valve 38. That is, the handle is employed to move the directional control valve 38 from the neutral position to the other two positions. It is appreciated that the directional control valve could be an automatic push button control valve, such as illustrated in FIG. 1. A pressure control valve 36 is operatively connected between the power pack 34 and the directional control valve 38. In particular, the pressure control valve 36 is placed in a pressure line that extends between the power pack 34 and the directional control valve 38 that supplies the hydraulic fluid that extends the rod 50A of the cylinder 50. Pressure control valve 36 allows the force of the plunger 52 to be varied based on the type of biomass being conditioned and the properties or conditions of the chopped biomass.

Various hydraulic power packs can be selected for the system. In one example, the hydraulic power pack tested delivered 1.9 gallons of hydraulic fluid per minute. This yielded a relatively slow plunger velocity of 1 ft./min. This was found to be advantageous because the velocity of the plunger allowed the chopped biomass to relax in the chamber and is also helpful in preventing substantial biomass rebound when the plunger is retracted.

A load cell may be incorporated into the hydraulic system 32. For example, a low profile load cell can be incorporated into the hydraulic system to measure the amount of force being applied by the hydraulic cylinder 50. Such a load cell can be connected to a strain and process meter with an LED display for revealing the force readings.

The size and stroke of cylinder 50 can vary. In one example, the cylinder 50 may have a 3.5" bore diameter and an 18" stroke. The stroke of the cylinder 50 may be selected to allow an appropriate amount of compression between the fully extended plunger 52 and the first end plate 25A. In one example, cylinder 50 has a maximum pressure of 3,000 psi which is generally sufficient in many applications to yield a chopped biomass bulk density of at least 15 lb/ft$^3$.

As alluded to above, the finished bales of chopped biomass are discharged into a bag or a container 24. It is desirable that the bag or container be of a type that, when closed, will prevent air and liquid from entering the enclosure. This helps ensure that the packaged chopped biomass will be maintained under anaerobic conditions. In one example, bags can be constructed of non-woven cotton that is generally impervious to air. As discussed briefly above, the bags can be slipped over the end section 22 and the finished chopped biomass bales can be directly discharged into the bags. To package the chopped biomass for long term storage without a high risk of spoilage, it is desirable to package the densified chopped biomass immediately after densification. This increases the probability that the chopped biomass can be maintained for a long term without a high risk of spoilage.

Figure 3A:
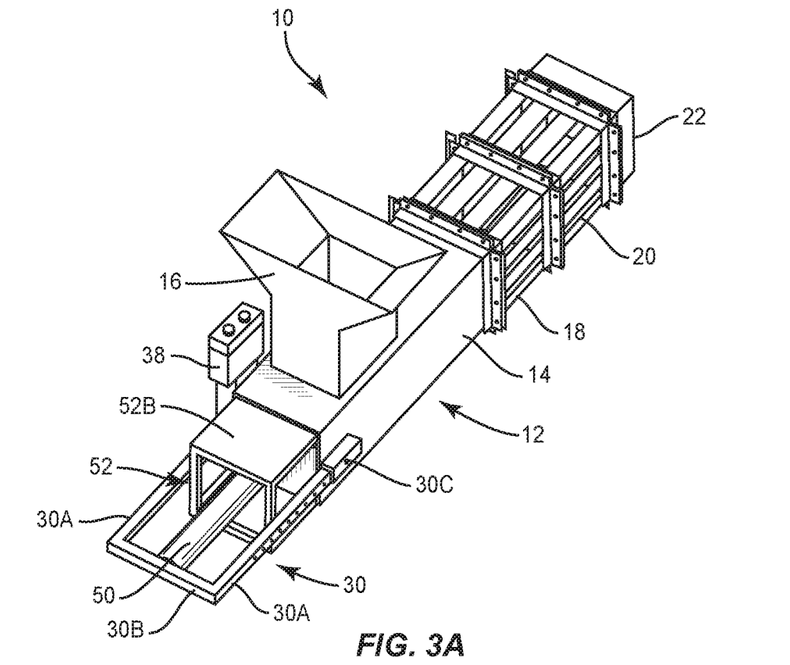
FIG. 3A is a perspective view of the apparatus prior to chopped biomass being fed into the apparatus.
Figure 3B:
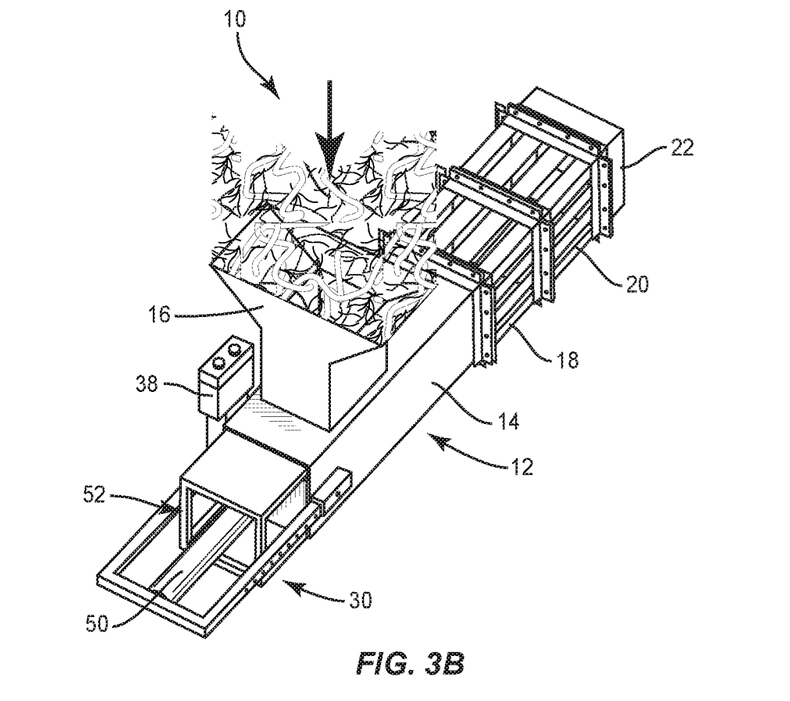
FIG. 3B is a perspective view of the apparatus showing chopped biomass being fed into a hopper that lies above a portion of a compression chamber that forms a part of the apparatus.
Figure 3C:
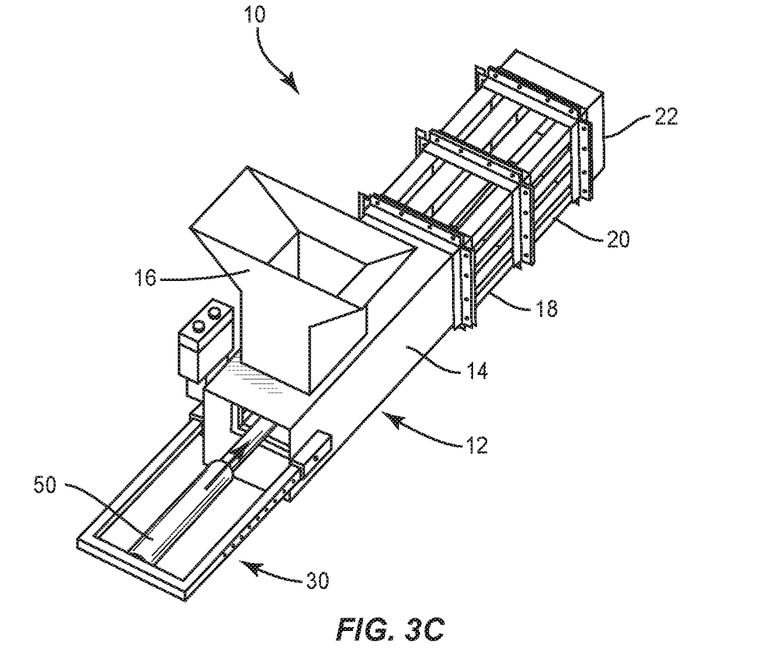
FIG. 3C depicts the apparatus with the plunger fully extended during a compression stroke.

The process of conditioning and packaging freshly chopped biomass begins by closing all of the end plates 25A, 25B, and 25C. See FIG. 3A. Plunger 52 is retracted such that it is positioned upstream from the opening in the hopper 16. FIG. 2A. Next, chopped biomass is fed into the hopper. FIG. 3B. After a batch of biomass has been fed into the hopper, an operator actuates the directional control valve 38 and causes the plunger 52 to extend. This results in the plunger engaging the biomass in the initial section 14 and moving it towards the first end plate 25A which is closed. This process continues. That is, biomass is fed into the hopper 16 and the plunger compresses the biomass against the first end plate 25A and then the plunger is retracted. This process is continued until the compressed biomass adjacent the upstream side of the end plate 25A reaches a desired bulk density, which in one embodiment is a density greater than 15 lb/ft$^3$.

Figure 3D:
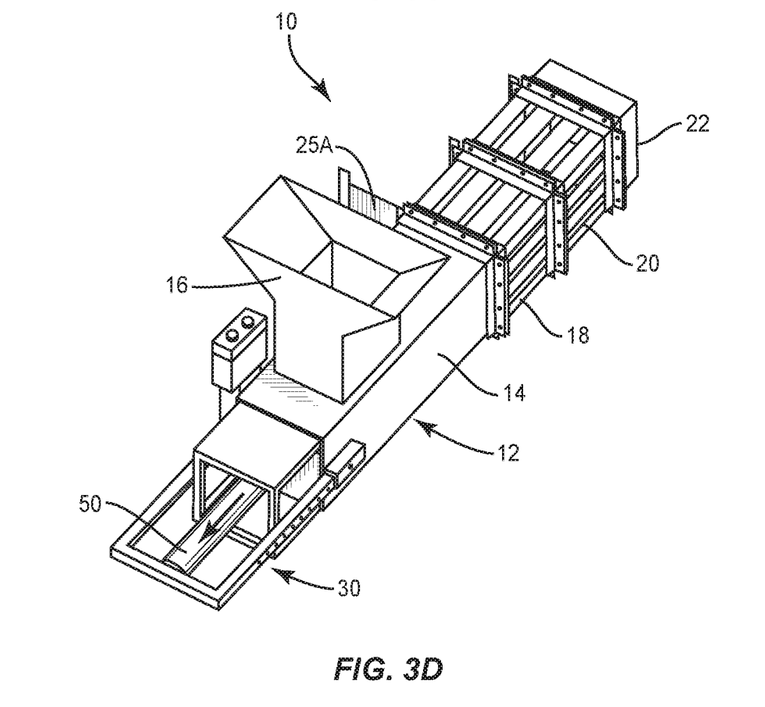
FIG. 3D shows the apparatus where the first end plate has been moved from the closed position to an open-outside position.
Figure 3E:
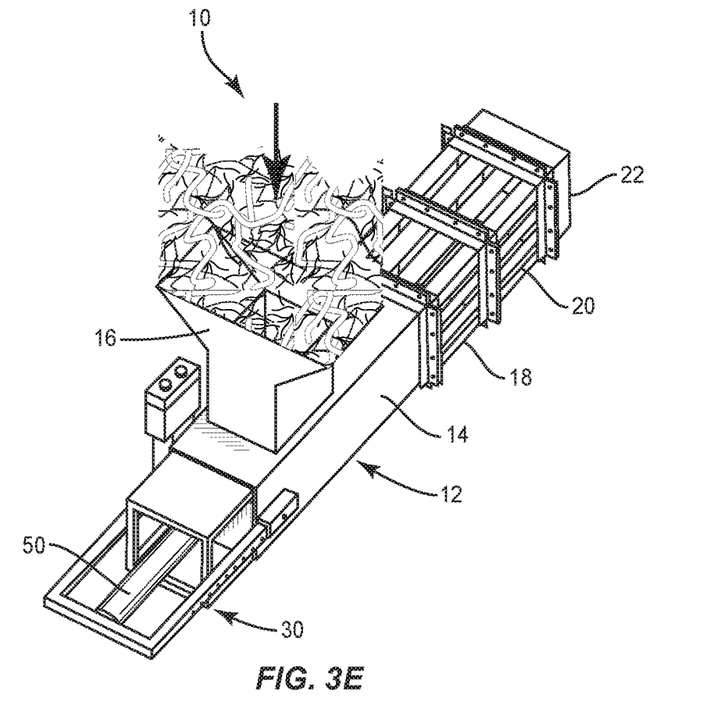
FIG. 3E shows a continuing process where chopped biomass is fed into the hopper of the apparatus.
Figure 3F:
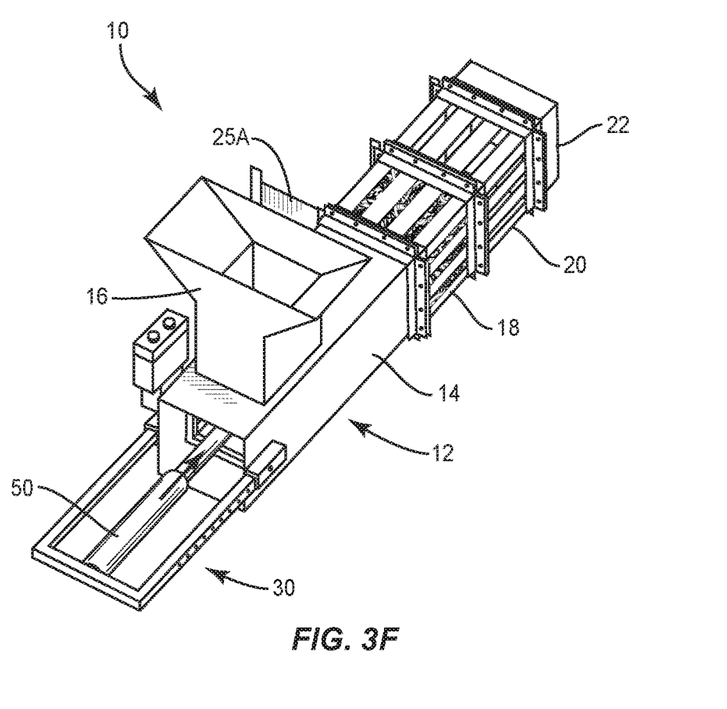
FIG. 3F shows a continuation of the process where the plunger has been fully extended and the compressed biomass is shown passing through the section of the compression chamber just downstream of the initial section.

At this point, the first end plate 25A is moved to the outside position. FIG. 3D. Now additional batches of chopped biomass are fed into the hopper 16 and into the underlying initial section 14 of the compression chamber 12. FIG. 3E. Between batches of biomass being fed into the compression chamber 12, plunger 52 is extended and the biomass just fed into the compression chamber 12 is pushed downstream 34. After each compression stroke of the plunger, the plunger is retracted such that additional chopped biomass can be fed into the initial section 14 ahead of the position of the plunger 52. Eventually the plunger compresses the biomass in the compression chamber 12 against the second end plate 25B. FIG. 3F.

Figure 3G:
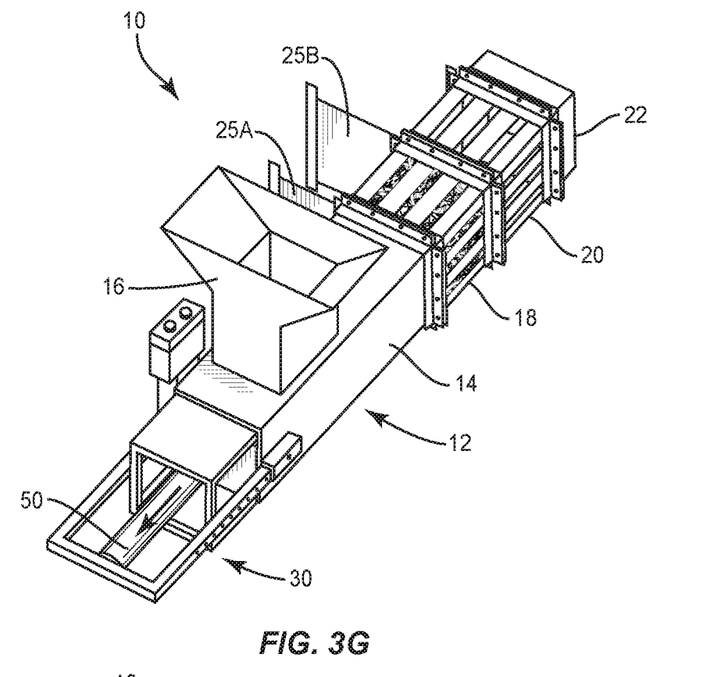
FIG. 3G shows a continuation of the process and particularly where the second end plate has been moved from the closed position to the open-outside position.
Figure 3H:
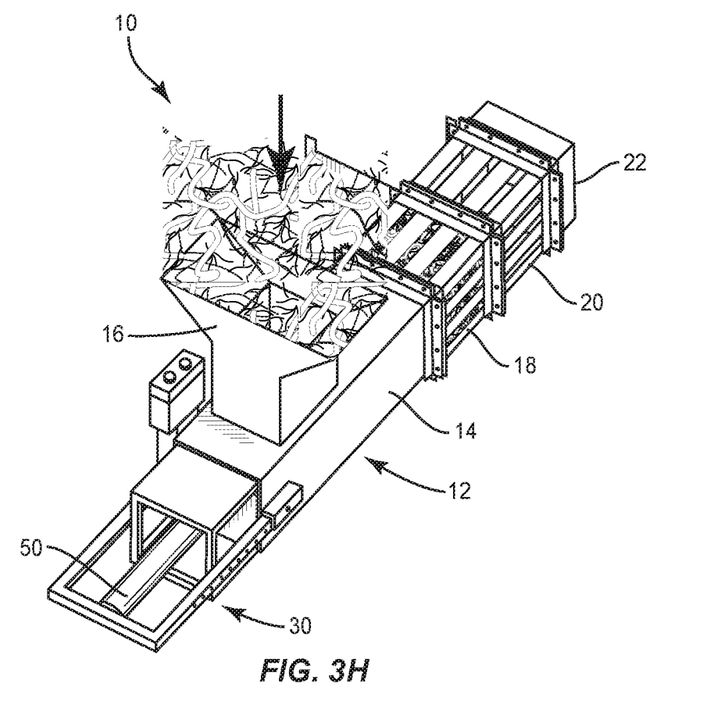
FIG. 3H shows a continuation of the process where freshly chopped biomass is being fed into the hopper and into the underlying initial section of the compression chamber.
Figure 3I:
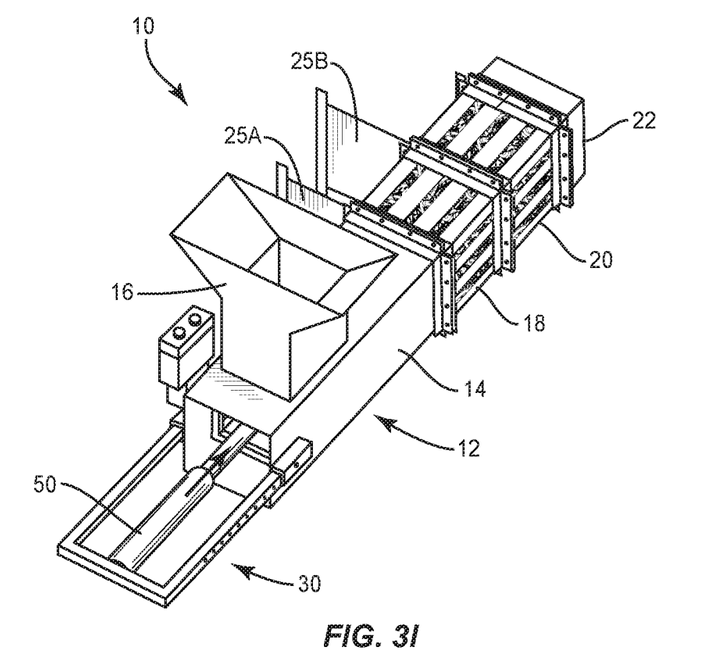
FIG. 3I shows a continuation of the process and depicts the plunger in an extended position and showing compressed biomass passing through a final portion of the compression chamber.
Figure 3J:
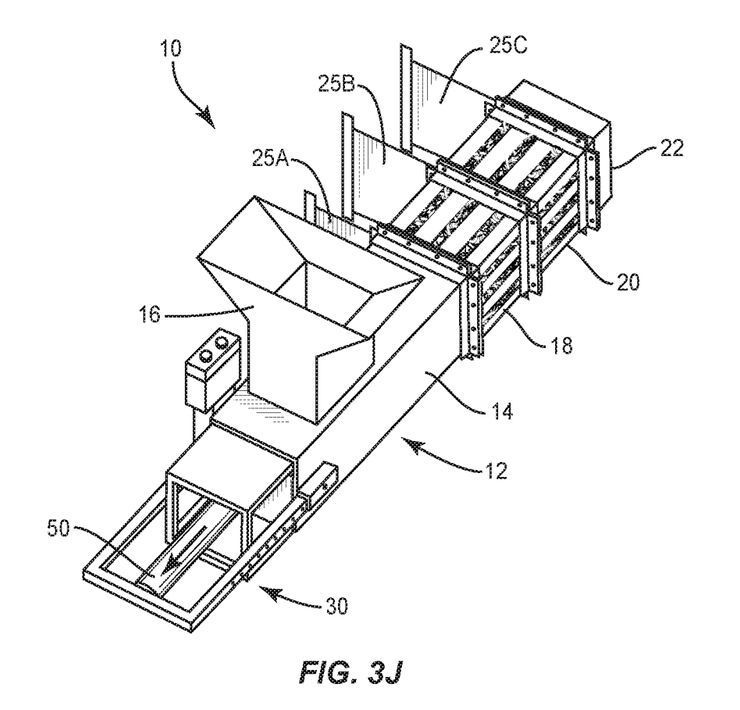
FIG. 3J shows the third end plate being moved from the closed position to the open-outside position.
Figure 3K:
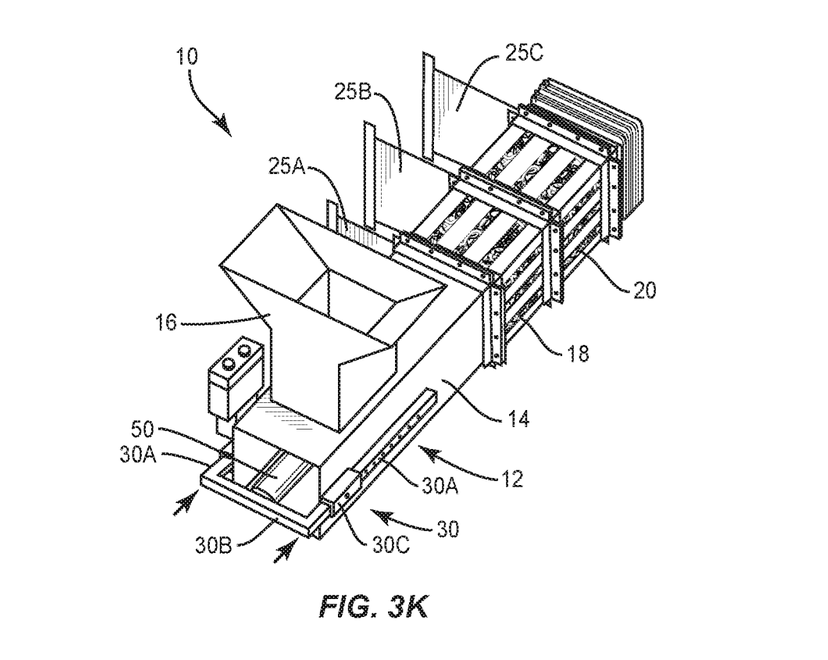
FIG. 3K is a continuation of the process and shows the superstructure that supports the plunger being moved to a downstream position to facilitate the discharge of a finished bale of chopped biomass.

Once the biomass between the extended plunger 52 and the second end plate 25B is of an acceptable density, the second end plate is moved to the outside position. FIG. 3G. The same process—feeding biomass into the compression chamber followed by compression and then retraction—is continued and the biomass is compressed against the third end plate 25C. A finished bale of biomass is produced once the biomass disposed upstream of the third end plate 25C is deemed of an appropriate density. FIG. 3. Now the third end plate 25C is opened (FIG. 3J) and now the densified bale of biomass is discharged from the apparatus 10 through the end section 22. FIG. 3K. As noted above, in one embodiment a pliable bag 24, such as a non-woven cotton bag, is placed such that its opening extends around the exterior surface of the end plate 22. Thus when the finished bale is discharged from the apparatus, it is discharged directly into the bag 24. After which the bag is closed such that air cannot enter the bag 24. As noted above, the conditioning of the biomass by expelling air and liquid from the biomass, coupled with the densification described, prepares the finished bale to be maintained inside the bag under anaerobic conditions for a long term without spoilage.

Figure 3L:
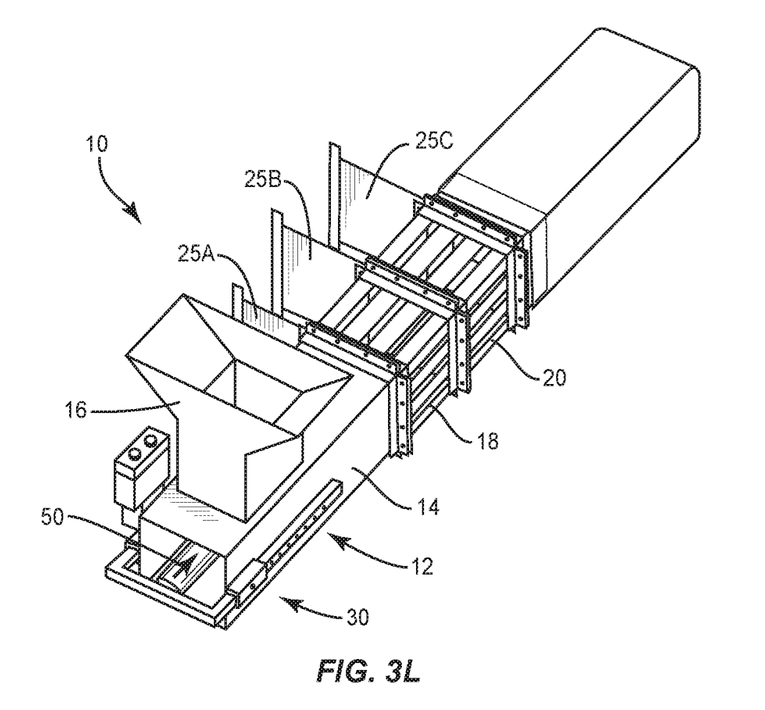
FIG. 3L is a continuation of the process depicted in FIG. 3K where the finished bale has been discharged into a bag.
Figure 3M:
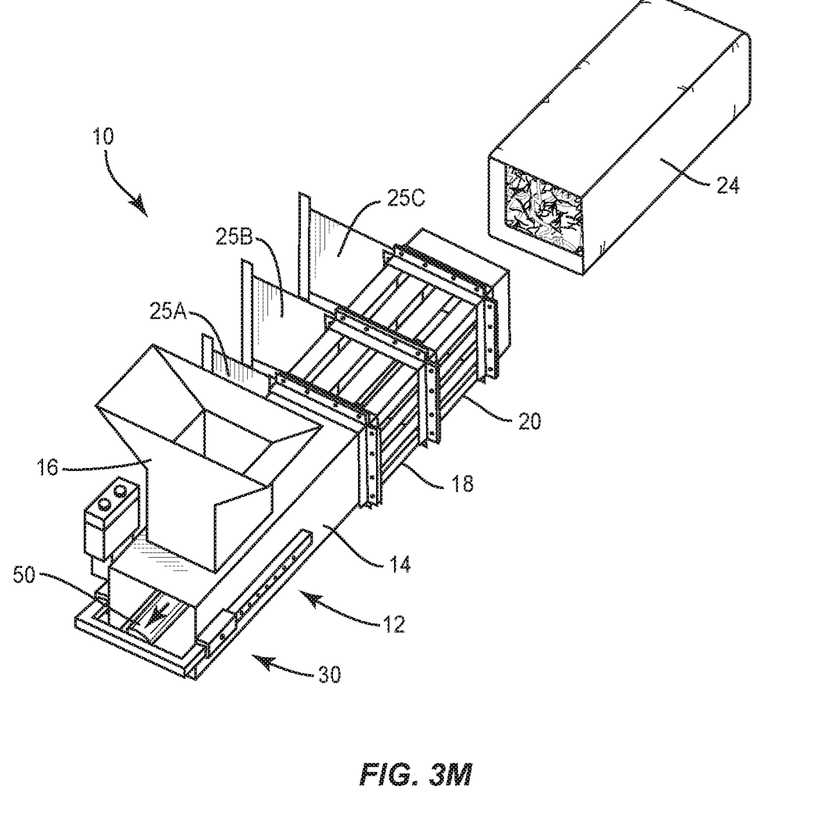
FIG. 3M is a continuation of the process and shows the finished bale inside a bag and removed from the apparatus.

During the process of compressing and densifying the chopped biomass, the superstructure 30 remains in the same position. FIGS. 3A-3J. The stroke of the plunger 52 is sufficient to form an elongated bale which, in one embodiment, includes dimensions of 1'×1'×3'. Once the finished bale of chopped biomass is produced, then the apparatus 10 is prepared to discharge the bale through the end section 22 into the bag 24. However, in one example it is necessary to reposition the superstructure 30, as well as the cylinder 50 and plunger 52 supported by the superstructure. Here the superstructure 30 is moved towards the downstream end of the apparatus 10 and secured in place such that the stroke of the plunger is able to pass through the initial section 14 and through the downstream section 18 and partly through the section 20. See FIGS. 3K-3M. In one embodiment, the superstructure 30 is moved towards the discharge end of the apparatus 10 such that the stroke of the plunger 52 reaches generally the mid-point of section 20. This is sufficient to facilitate the discharge of the finished bale. At this point, the bale can easily be pushed into the awaiting bag 24.

It is therefore appreciated that the finished bale is formed by forming partial bales and integrating those partial bales together to form a finished bale. That is, by compressing freshly chopped biomass fed into the hopper 16 and sequentially opening the end plates 25A, 25B, and 25C, a finished bale is produced. Expressed in another way, a first partial bale is formed between the fully extended plunger 52 and the first end plate 25A. Then the first end plate 25A is removed and new chopped biomass is fed into the hopper and compressed towards the second end plate 25B. The compression continues until a second partial bale is formed between the fully extended plunger 52 and the second end plate 25B. Then the second end plate 25B is removed and new chopped biomass is fed into the hopper and compressed towards the second partial bale. Compression is continued until the finished bale is formed between the fully extended plunger 52 and the third end plate 25C. In one embodiment, each of the partial bales is densified to a selected level, with the aim being a bulk density of greater than 15 lb/ft$^3$. Once the partial bales are fully integrated, it follows that the finished bale will have an acceptable bulk density.

An alternative method or process entails replacing the plates 25A, 25B and 25C with a single plate or bulkhead that is progressively moved down the compression chamber and stationed at one location after another in the process of forming a bale of freshly chopped biomass. The bulkhead assumes an initial position and a first batch of freshly chopped biomass is compressed against the bulkhead at this first position. Once a selected bulk density has been reached, the bulkhead is moved from the initial position downstream to a second position. A second batch of freshly chopped biomass is fed into the compression chamber and compressed against the partial bale formed by the first batch of freshly chopped biomass. The second batch of chopped biomass and the partial bale are compressed together with the bulkhead in the second position. Once the combined biomass in the compression chamber has reached a predetermined density, the bulkhead is moved further downstream to a third position and stationed. A third batch of freshly chopped biomass is fed into the compression chamber and compressed against the second batch of biomass and the initial partial bale. Again, the contents in the compression chamber are compressed until a predetermined bulk density is achieved. Thereafter, the bulkhead is removed and the finished bale is discharged into an airtight bag or other container.

Thus, from the foregoing specification, it is seen that the present invention described a system and process that conditions and packages densified chopped biomass for long term storage. The conditioning and densification of the biomass assures that its composition properties remain stable during long term storage. Moreover, the finished bales are of such a size, weight and shape that they can be easily handled and transported.

The term "configured to" is used in the specification and claims. The term "configured to" means "designed to" and is more narrow than "capable of".

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of conditioning and packaging freshly chopped biomass feedstock for long term storage, the method comprising:
   obtaining the freshly chopped biomass feedstock;
   feeding the freshly chopped biomass feedstock into a horizontal baler having an elongated compression chamber having at least first and second removable end plates spaced longitudinally along the compression chamber and wherein the first and second end plates are configured to assume spaced apart transverse positions in the compression chamber during the conditioning of the freshly chopped biomass feedstock;
   engaging the freshly chopped biomass feedstock with a reciprocating plunger, that is independent of the first and second end plates, and moving the reciprocating plunger longitudinally back and both in the compression chamber and compressing the freshly chopped biomass feedstock against the first end plate extending across the compression chamber to form a part of a bale of freshly chopped biomass feedstock;
   after the part of the bale of the freshly chopped biomass feedstock has been compressed a selected amount, the method includes removing the first end plate from the compression chamber;
   positioning the second end plate in the compression chamber downstream from the position formerly occupied by the first end plate such that the second end plate extends transversely across the compression chamber;
   feeding additional freshly chopped biomass feedstock into the baler;
   compressing the additional freshly chopped biomass feedstock against the part of the bale of freshly chopped biomass feedstock and causing the part of the bale to move downstream through the compression chamber and engage the second end plate;
   compressing the additional freshly chopped biomass feedstock and the part of the bale against the second end plate to form a bale of freshly chopped biomass feedstock;
      after the bale of freshly chopped biomass feedstock is formed, removing the second end plate from the compression chamber;
      employing the plunger to push the bale of freshly chopped biomass feedstock longitudinally through the compression chamber and through an area formerly occupied by the second end plate and out an end of the compression chamber; and
      packaging the bale of freshly chopped biomass feedstock.

2. The method of claim 1 wherein the compression chamber includes a third removable end plate configured to assume a position in the compression chamber downstream from the position formerly occupied by the second end plate.

3. The method of claim 1 wherein the compression chamber includes multiple sides and wherein a portion of some sides are generally closed while another portion of the sides are generally slotted or perforated.

4. The method of claim 1 wherein packaging the bale of freshly chopped biomass feedstock includes discharging the bale from the baler into a bag and closing the bag.

5. The method of claim 1 wherein conditioning the freshly chopped biomass feedstock includes expelling air and liquid from the freshly chopped biomass feedstock and out the compression chamber in the course of compressing the freshly chopped biomass feedstock in the compression chamber.

6. The method of claim 1 wherein the plunger is supported on a moveable support structure that is secured to an upstream end of the baler; and the method includes bodily moving the support structure and the plunger supported thereon towards the downstream end of the baler during the method to facilitate discharging the bale from the baler.

7. The method of claim 1 wherein packaging the bale of freshly chopped biomass feedstock comprises:
   discharging the bale of freshly chopped biomass feedstock from the compression chamber into an airtight bag or container; and
   closing the airtight bag or container and maintaining the freshly chopped biomass feedstock under anaerobic conditions in the airtight bag or container.

8. A method of conditioning freshly chopped biomass and packaging the freshly chopped biomass to prevent the freshly chopped biomass from spoiling during long term storage, the method comprising:
   feeding the freshly chopped biomass into a baler having a compression chamber and a reciprocal plunger;
   densifying the freshly chopped biomass by engaging the freshly chopped biomass in the baler with the reciprocating plunger and compressing the freshly chopped biomass against an end plate forming a part of the compression chamber;
   expelling air or liquid from the freshly chopped biomass and out the compression chamber in the course of compressing the freshly chopped biomass;
   continuing to compress the freshly chopped biomass in the compression chamber until the bulk density of the compressed freshly chopped biomass equals or exceeds 15 lb/ft$^3$;
   wherein compressing the freshly chopped biomass in the compression chamber forms a bale of freshly chopped biomass;
   discharging the bale of freshly chopped biomass from the baler into a generally airtight bag or container;
   closing the bag or container such that anaerobic conditions are maintained in the bag or container; and
   reducing or minimizing rebound of the freshly chopped biomass in the course of compressing the freshly chopped biomass by holding the plunger in an extended position against the freshly chopped biomass for a time period exceeding 30 seconds during one or more of the strokes of the plunger.

9. The method of claim 8 wherein the baler includes an end section projecting from the compression chamber; and wherein discharging the bale of freshly chopped biomass from the baler includes fitting an opening of a bag around a portion of the exterior of the end section and pushing the bale of freshly chopped biomass through the end section into the bag and thereafter closing the opening of the bag.

10. The method of claim 8 including expelling air and liquid from the freshly chopped biomass being compressed through a slotted or perforated section of the compression chamber.

11. The method of claim 8 wherein the plunger is supported on a moveable support structure that is secured to an upstream end portion of the baler; and the method including bodily moving the support structure and the plunger supported thereon toward the discharge end of the baler during the course of discharging the bale from the baler.

12. A method of conditioning freshly chopped biomass and packaging the freshly chopped biomass to prevent the freshly chopped biomass from spoiling during long term storage, the method comprising:
  stationing a bulkhead at an initial position in a compression chamber;
  feeding a first batch of freshly chopped biomass into the compression chamber and compressing the freshly chopped biomass against the bulkhead with a reciprocating plunger;
  continuing to compress the first batch of freshly chopped biomass against the bulkhead until the bulk density of the first batch of freshly chopped biomass exceeds a threshold value at which time the compressed biomass forms a partial bale;
  after forming the first batch of freshly chopped biomass into a partial bale, moving the bulkhead from the initial position down the compression chamber to a second position downstream from the initial position;
  stationing the bulkhead in the second position;
  feeding a second batch of freshly chopped biomass into the compression chamber;
  compressing the second batch of freshly chopped biomass against the partial bale and in the process moving the partial bale and the second batch of freshly chopped biomass towards the bulkhead stationed in the second position;
  continuing to compress the second batch of freshly chopped biomass and the partial bale against the bulkhead in the second position until the combined partial bale and the compressed second batch of freshly chopped biomass exceeds a threshold bulk density;
  moving the bulkhead from the second position to a downstream third position;
  feeding a third batch of freshly chopped biomass into the compression chamber and compressing the third batch of biomass against the second batch of compressed biomass and causing the second batch of compressed biomass and the partial bale to move down the compression chamber where the partial bale engages the bulkhead in the third position;
  wherein the second and third batches of freshly chopped biomass and the partial bale form a bale; and
  discharging the bale of freshly chopped biomass from the compression chamber into an airtight container.

13. The method of claim 8 further including conditioning the freshly chopped biomass by expelling air and liquid from the freshly chopped biomass and out the compression chamber in the course of densifying the freshly chopped biomass.

* * * * *